United States Patent [19]
Monner

[11] Patent Number: 6,138,956
[45] Date of Patent: Oct. 31, 2000

[54] AEROFOIL PROFILE WITH VARIABLE PROFILE ADAPTATION

[75] Inventor: Hans Peter Monner, Braunschweig, Germany

[73] Assignee: Deutsches Zentrum fur Luft-und Raumfahrt e.V., Bonn, Germany

[21] Appl. No.: 09/157,738

[22] Filed: Sep. 21, 1998

[30] Foreign Application Priority Data

Sep. 19, 1997 [DE] Germany ............................ 197 41 326

[51] Int. Cl.$^7$ ....................................................... B64C 3/44
[52] U.S. Cl. ........................................... 244/215; 244/219
[58] Field of Search .................................. 244/215, 213, 244/212, 219

[56] References Cited

U.S. PATENT DOCUMENTS

| | | | |
|---|---|---|---|
| 1,500,810 | 7/1924 | Glasby, Jr. ............................... | 244/219 |
| 3,042,371 | 7/1962 | Fanti ....................................... | 244/219 |
| 3,109,613 | 11/1963 | Bryant et al. ............................ | 244/219 |
| 3,146,973 | 9/1964 | Haase ...................................... | 244/219 |
| 3,332,383 | 7/1967 | Wright .................................... | 244/219 |
| 3,698,668 | 10/1972 | Cole ....................................... | 244/219 |
| 3,994,452 | 11/1976 | Cole ....................................... | 244/219 |
| 4,113,210 | 9/1978 | Pierce ..................................... | 244/219 |
| 4,247,066 | 1/1981 | Frost et al. .............................. | 244/219 |
| 4,312,486 | 1/1982 | McKinney .............................. | 244/219 |
| 4,351,502 | 9/1982 | Statkus ................................... | 244/219 |
| 5,150,864 | 9/1992 | Roglin et al. ............................ | 244/219 |
| 5,186,420 | 2/1993 | Beauchamp et al. .................... | 244/219 |
| 5,224,826 | 7/1993 | Hall et al. ............................... | 244/219 |

FOREIGN PATENT DOCUMENTS

| | | |
|---|---|---|
| 367939 | 1/1923 | Germany . |
| 1 234 874 | 8/1967 | Germany . |
| 27 13 902 A1 | 10/1977 | Germany . |
| 23 48 304 | 1/1980 | Germany . |
| 27 55 442 C2 | 7/1985 | Germany . |
| 40 02 972 C2 | 6/1994 | Germany . |
| 215048 | 5/1924 | United Kingdom . |
| 290300 | 8/1929 | United Kingdom . |
| 472567 | 9/1937 | United Kingdom . |
| 1124358 | 8/1968 | United Kingdom . |
| 1339018 | 11/1973 | United Kingdom . |
| 1536331 | 12/1978 | United Kingdom . |
| 2059368 | 4/1981 | United Kingdom . |

*Primary Examiner*—J. Woodrow Eldred
*Attorney, Agent, or Firm*—Salter & Michaelson

[57] ABSTRACT

In an aerofoil profile with variable profile adaptation, a rib structure of the aerofoil profile is provided which has rigid regions and flexible regions. The flexible region of a rib has at least three rib elements. The rib elements are articulated to one another in kinematic chain arrangement. Driving means are provided for the introduction of force into a movable part of the flexible region of the rib structure, whereby the movement of at least one other rib element may be activated by a stimulated movement of the rib element.

21 Claims, 9 Drawing Sheets

AEROFOIL PROFILE WITH VARIABLE PROFILE ADAPTATION

DESCRIPTION

1. Technical Field

The invention relates to an aerofoil profile with variable profile adaptation.

2. Background of Related Art

Currently in the case of modern subsonic commercial aircraft the design of wings as aerofoil profiles is constantly optimised for a single operating point. However, an aircraft is exposed to constantly changing external conditions from take-off to landing and is, moreover, constantly exposed to new flight conditions as a result of the operation, e.g. as a result of the fuel consumption and the resulting weight loss. In order to achieve optimum operating conditions with these different phases of a flight, flaps are generally used in commercial aircraft, by means of which it is possible to adapt the wing profile mainly in the take-off and landing phase. To be able to utilize the maximum flow potential over the entire mission profile, an optimum adaptation of the wing geometry is necessary for each flight status. It has proved to be particularly appropriate to provide thereby a corresponding geometric adaptation in the region of the arching of the trailing edges of the wing.

Extrapolations over the next twenty years for such performance-enhancing measures for subsonic commercial aircraft have revealed that a reduction in fuel consumption or requirement of an aircraft of up to 36% is possible merely by optimising the aerodynamics of a wing.

Various measures are known for optimisation of the aerodynamics of a wing. For example, extensible leading and trailing edge flaps of modern commercial aircraft are known which are used during the take-off and landing phase, i.e. in the period of slow flight. In contrast, only few improvements in performance have been made for the fast flight phase of subsonic-long-distance aircraft at high and medium altitudes.

Arching of wing trailing edges by shape memory alloy wires is known from U.S. Pat. No. 5,186,420. In this case, the restoring force of shape memory alloy (SMA) materials in the form of shape memory alloy wires is used to thereby change the profile of the wing's trailing edges. An SMA wire system located in an insulation chamber for movement of an arching flap is described therein. The insulation chamber thereby serves to control any thermal activation of the SMA wire.

An alternative solution for changing the profile of the curved surface of a wing by means of shape memory alloy wires (SMA wires) is disclosed in U.S. Pat. No. 5,150,864, wherein the shape memory alloy wires are spanned in zigzag lines within one plane, in contrast to the shape memory alloy wires in U.S. Pat. No. 5,186,420, in which these wires are deflected over corresponding rolls.

A further solution is described in U.S. Pat. No. 5,224,826, in which arching is caused by piezoelectric materials. Besides the piezoelectric materials, other actively deformable materials, such as magnetostrictive and electrostrictive elements, are disclosed therein for movement of the flaps on a wing's rear edge and leading edge. The flaps are thereby attached to the wing's trailing edge by a flexible connection, in particular a hinge made of flexible material.

From U.S. Pat. No. 3,042,371 a solution is known in which the wing's trailing edge is made from a bimetal, the wing's leading edge being of rigid construction.

GB 1 124 358 discloses a possibility of changing a wing profile by pneumatically folding intermediate segments. Individual segments are thereby formed within the wing, and between these an expandable bag, which may be filled with compressed air and also emptied again, is respectively provided in an interstice. As a result, the individual segments can be moved towards one another and inclination of the wing profile thus achieved.

DE 12 34 874 shows a further possibility, in which structural elements made of plastic tubes are arranged inside a flexible planking structure on both sides of a wing in such a way that when the tubes are filled with compressed air or a hydraulic fluid, a change in profile of the wing occurs as a result of different tensions within the structural elements.

An intelligent movement mechanism for influencing flow media, in particular for jet deflection blades, for thrust-vector control and for wings is disclosed in DE 23 48 304. A wing is provided therein with a skeleton support which is enclosed by the planking structure. The planking structure on the upper side therein is a flexible upper skin, which is firmly clamped in place either in the region of the front part (nose) or on the trailing edge of the wing, as is the bottom planking structure. The skeleton support is adjustable in relation to the planking structure in the direction of the profile depth of the flow member, namely the wing.

Arching of a wing on the basis of tilting elements connected rotatably to one another and an adjusting mechanism provided between these tilting elements is known from DT 2 713 902.

U.S. Pat. No. 3,109,613 discloses a spindle curved in the shape of a horn which is rotatably disposed in a slide bearing and in slide bearings permitting an axial movement over the span distance and an incline. Upon movement of the spindle, arching of the wing profile is effected because of the horn-shaped spindle structure.

Arching can also be effected by various lever mechanisms, as for example in the device disclosed in DE 27 55 442 for supporting the rudders and arching flaps of aircraft and watercraft. In this case, a lever mechanism and an upper flexible covering skin are provided in the region between the flap and the rigid part, of the aircraft and watercraft. The flap element is for example, of the aircraft and watercraft. The flap element is thereby run into a front part and extended from this again by means of the lever mechanism.

Further complicated lever mechanisms for arching corresponding arching flaps are known from U.S. Pat. No. 4,312,486, U.S. Pat. No. 4,351,502 and GB 2 059 368. In the latter a mechanism is disclosed which comprises a rotary arm, which is rotatably connected to a rigid part, driven via an active hinge, and rotatably connected to a movable part. Two further parts are rotatably coupled to one another in a point so as to be axially displaceable via a sliding sleeve. One of the two parts is thereby firmly connected to the rigid part and the other is firmly connected to the movable part.

The known arching measures illustrated above are mainly used in flow adaptation in aircraft technology, but are also used for watercraft construction, helicopter rotor blades and for the deflection of flow media. Because of the high aerodynamic stresses prevailing in commercial aircraft technology, not all the illustrated solutions can be applied in an unrestricted manner.

Therefore, the object of the invention is to provide an aerofoil profile with variable profile adaptation, which is constructed in a suitable manner for a lightweight construction and at the same time can very favorably withstand the high stresses arising during the flight.

SUMMARY

The object is achieved by an aerofoil profile with variable profile adaptation, in which a rib structure of the aerofoil profile is provided which has rigid regions and flexible regions, the flexible region of a rib has at least three rib elements, the rib elements are articulated to one another in kinematic chain arrangement, and driving means are provided for the introduction of force into a movable part of the flexible region of the rib structure, whereby the movement of at least one other rib element may be activated by a stimulated movement of the rib element. Further configurations of the invention are defined in the respective sub-claims.

In the case of a wing as an aerofoil profile in commercial aircraft, variable arching of the wing trailing edges is achieved according to the invention by flexible structuring of the Fowler flaps. It is very important thereby to permit arching of the wing trailing edges which is both constant over the span distance and also differentiated over the span distance, whereby their contours should remain smooth and constant. A constant arching of the wing trailing edges thereby serves to optimise the contour during the cruising flight so as to be able to achieve a greater or lesser degree of arching in dependence upon the Mach number and flying weight. Arching is at greatest at the beginning of the cruising flight, i.e. with a high flying weight, whereas only slight arching is necessary at the end of the cruising flight, i.e. with a very low flying weight. A redistribution of the wing loads in dependence upon the respective flying status is undertaken by the provision of arching which is differentiated over the span distance. Particularly with narrow, large wings, this provides the possibility of being able to control the critical wing connection over the entire flying range.

An aerofoil profile, e.g. a wing with variable profile adaptation, is provided, in which the Fowler flaps are furthermore provided with ribs or a rib structure, which by means of its high shearing strength absorbs a high proportion of the air loads prevailing during the flight and decisively contributes to the overall flap rigidity. Because of the respectively preferred provision of only one driving means or actuator per rib, an advantageous saving in weight is achieved in comparison to the prior art, which generally uses a large number of actuators. The remaining structure of the flexible region of the rib structure or of a respective rib in the form of particularly preferred flat, disc-shaped rib elements placed one behind the other is suitable for a lightweight construction and in comparison with the prior art saves a large amount of weight.

It is particularly preferred if the rib elements are provided with means for the engagement of sliding and/or rotating links and are formed so that they may be connected to the adjacent rib elements. This causes only a slight increase in thickness in comparison to a known rigid rib. As a result of the particularly preferred connection of the individual rib elements to one another by means of rotating links, e.g. by means of bolts or similar structural elements, a slight increase in thickness and weight is indeed achieved with respect to a rigid rib. However, the high rigidity of a disc is used as a result of the disc-shaped construction of the rib elements, which results in a very good design suitable for lightweight construction.

The rib elements are arranged in segments one behind the other and connected to one another via sliding and/or rotating links. It is particularly preferred if a driving means is provided as actuator, in particular a longitudinal or rotary actuator, in a respective rib of the rib structure. This directs a force either into a rib element or into a link of the flexible region of the rib structure. The flexible region is then moved by the kinematic arrangement of the rib elements one behind the other in the form of a kinematic chain. The rib elements are inclined towards one another and form the arching of the aerofoil profile. So as not to generate any distortions in the region of skin panels enclosing the rib structure when the rib elements are inclined towards one another, at least one part of the skin panel surrounding the flexible region of the rib structure can slide over this rib structure.

It is particularly preferred if the rib elements are at least partially elastically expandable and compressible and/or essentially rigid. If the rib elements are elastically expandable and compressible, the links between the rib elements are constructed as rotating links. On the other hand, if the rib elements are essentially rigid, rotating and sliding links are provided between the rib elements. A combination of elastically expandable and compressible and essentially rigid rib elements could also be provided, should this appear desirable in accordance with the application.

The rib elements preferably have openings as means for engaging sliding and/or rotating links. In this case, a large central opening is preferably provided and adjacent to it two respective further openings passing completely through the rib elements are provided.

It is particularly preferred if a lever element is provided into which the driving means introduces a force and which is disposed in two links of the flexible region of the rib structure, whereby at least four rib elements are provided in this case. One or more further lever elements can preferably also be provided, which respectively connect three rib elements to one another. At least three rib elements should be provided for such a construction.

As particularly preferred, an application-oriented variation of the angles of inclination of the individual rib elements to one another can be provided by variation of the length ratios between the links (sliding and/or rotating links) connecting the individual rib elements to one another.

In a preferred embodiment, the driving means or actuator is supported in the first rib element and introduces a force into a second rib element. The driving element can, however, also be supported in the aerofoil profile and introduces a force into any link connecting the rib elements to one another. However, alternatively hereto it can also introduce a force into any rib element itself.

The first rib element is preferably connected rigidly to the rigid region of the rib structure, is connected via a rotating link to a second rib element and is connected via a sliding link to a third rib element, whereby the second and third rib elements are connected to one another via a rotating link.

If the rib elements are elastically expandable and compressible, a rotating link is provided instead of the sliding link.

The rib elements are preferably made of a fibre composite, in particular a carbon or glass fibre composite. The actuators supply either a linear force or a torque. They are as small as possible so that they can in particular be placed in an opening inside the first rib element.

One actuator can be respectively provided per rib, or one actuator can be provided in the region of each link connecting the rib elements, or one actuator can be respectively provided only in the region of the outer side ends of the aerofoil profile, and connecting all the ribs in the flexible region, a rod-shaped means can be provided for parallel actuation of all the flexible regions of the respective ribs. The lateral outer actuators act on the rod-shaped means and introduce a force into this.

The aerofoil profile can be an airplane wing, plane, a helicopter rotor, a rotor of a wind power plant, flaps on a plane's tail or any other aerodynamic or flow profiles.

The rib elements of the ribs are preferably respectively flat and disc-shaped. The surface normal of the disc-shaped rib elements thereby preferably lies approximately parallel to the edge of the aerofoil profile and/or perpendicular to the rib.

The rib elements preferably have a symmetrical structure. They can be pushed inside one another. In preferred embodiments, the inclination is generated by support on the rib element located two ahead and/or via intermediate lifting.

Attachment to the element located two ahead is achieved in the open space of the element lying inbetween. The kinematic chain can be extended by as many elements as desired. The driving means can be arranged variably. All the kinematic principles can be actuated via an additional lever. The inclination can be achieved by actuation of any desired link or element. The degree of inclination of the elements to one another can be adjusted by variation of the leverage conditions.

Different forms of aerofoil profiles with lever-like adjusting mechanisms for changing the profile form are also known from U.S. Pat. No. 1,500,810, U.S. Pat. No. 3,146, 973, U.S. Pat. No. 3,332,383, DE-PS 367 939 and DE 40 02 972 A1. However, in these designs there is a lack of variability in actuator arrangement. The skin—where elastic—is not arranged to slide to the ribs, and the driving means of the kinematic arrangement is very complex and obtrusive.

BRIEF DESCRIPTION OF THE DRAWINGS

For more detailed explanation of the invention, embodiments are described below on the basis of the drawings.

DETAILED DESCRIPTION OF THE ILLUSTRATIVE EMBODIMENTS

Figure 1:
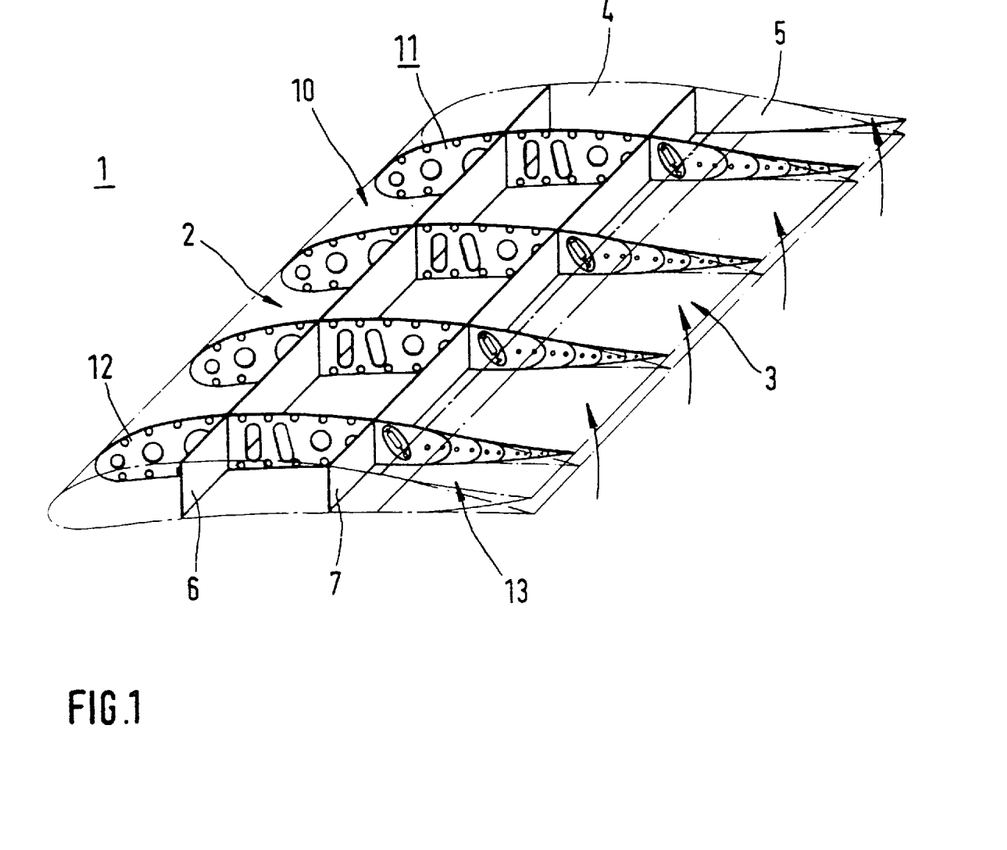
FIG. 1 shows a perspective view of a wing with variable profile adaptation constructed according to the invention.

FIG. 1 shows a perspective view of a wing 1 as an aerofoil profile with a front part 2 and trailing edge 3. The wing is formed from a rib structure 10 comprising four longitudinal ribs 11. The longitudinal rib structure 11 arranged in longitudinal direction of the wing and providing the profile is supported in the transverse extension of the wing by corresponding transverse ribs 6, 7. The entire structure is covered by skin panels 4, 5. Thereby, skin panel 4 is not capable of sliding, whereas skin panel 5 is arranged to be able to slide on the rib structure. The sliding capability of the skin panel is necessary to allow mobility of a flexible region 13 of the respective ribs 11. The non-sliding skin panel 4 is arranged above a rigid region 12 of the ribs 11. There is no mobility in this region, therefore there is no corresponding equalisation of a relative movement of skin panel and rib structure required.

The region of the skin panel 5 capable of sliding can also be larger, in particular the entire skin panel enclosing the wing can be capable of sliding in a predetermined manner, however it must be assured thereby that no bulging of the skin panel of the wing can arise. Therefore, it has proved advantageous to only form the region of the skin panel of the wing which must be moved to be capable of sliding. In this case, flaps, in particular Fowler flaps of the wing, are a particular example of application here.

The flexible region 13 of the wing or of its rib structure has individual rib elements. This may be seen more clearly from FIG. 2, which shows a side view of the detail of the flexible region. This region is formed by six rib elements 20 to 25 in the shown embodiment. The rib element 25 thereby represents a part of the trailing edge and the rib element 20 represents the connection to the rigid region 12 of the rib 11. The individual rib elements are connected to one another via links. These links can be sliding links 40 and/or rotating links 30.

Figure 2:
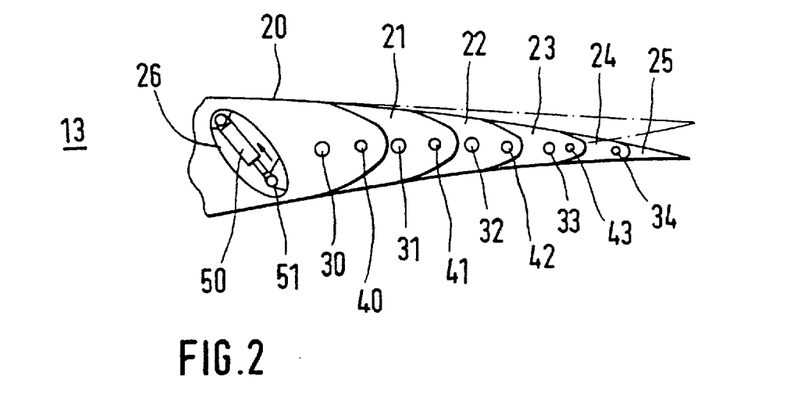
FIG. 2 shows a side view of the flexible region of a rib according to FIG. 1 in a downwardly arched position.

The rib element 20 has an opening 26. An actuator 50 is provided inside this opening 26, which is in the form of an oval elongated hole. The actuator 50 is firmly connected on one side to rib element 20. On the other side, it acts movably on rib element 21.

Figure 3:
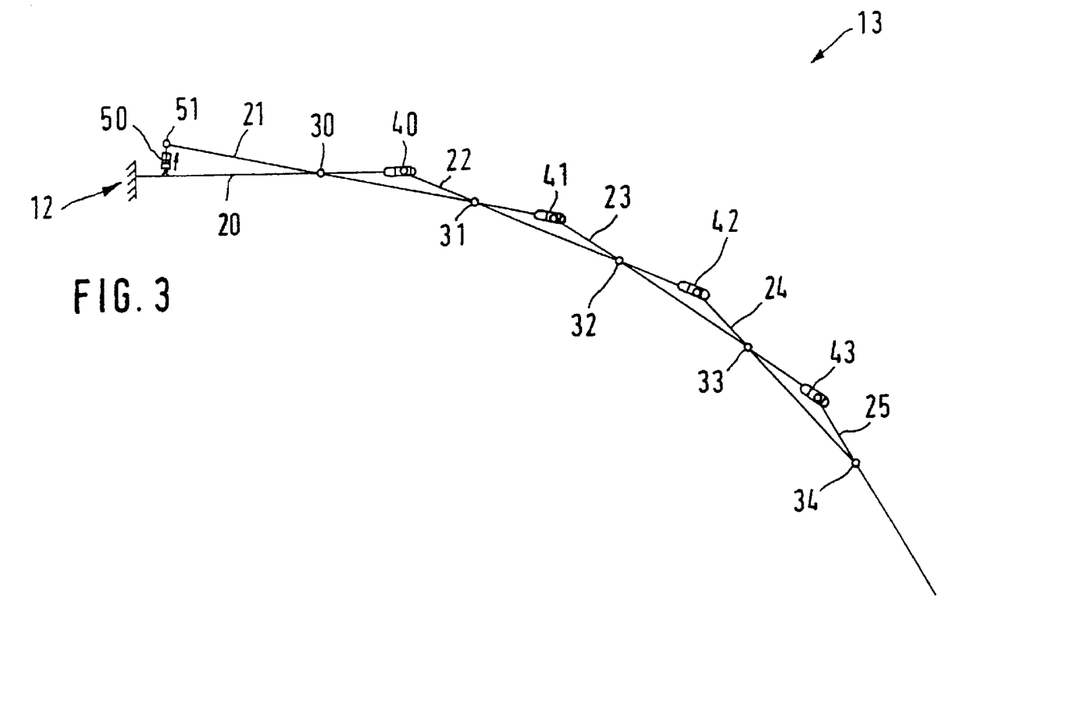
FIG. 3 is an elementary sketch to illustrate the function principle when rotating links and sliding links are provided between the rib elements of the flexible region.

FIG. 3 shows an elementary sketch to illustrate the function principle of the arching of the flexible region 13 of each rib 11. The actuator 50 is supported on the first rib element 20 firmly clamped in the rigid region 12 of the rib. This preferably constitutes the extension of the rigid region of the rib. The actuator 50 acts on rib element 21 via an actuating link 51. It therefore introduces a force into rib element 21 via this actuating link 51. The rib element 21 is connected to the first rib element 20 via the rotating link 30. Rib element 21 and rib element 22 are connected to one another via a rotating link 31. Rib element 20 is connected to rib element 22 via the sliding link 40.

The third rib element 22 and the fourth rib element 23 are connected to one another via a further rotating link 32. Rib element 21 is connected to this rib element 23 via a sliding link 41. The fourth rib element 23 and the fifth rib element 24 are in turn connected to one another via a rotating link 33. Rib element 24 and rib element 22 are connected via a sliding link 42. The fifth rib element 24 and the sixth rib element 25 are connected via a further rotating link 34 and rib element 25 and rib element 23 are connected to one another via a further sliding link 43. The rib element 31 is rotated around the link 30 by operating the actuator 50. As a result, the third rib element 22 is also driven via the rotating link 31. It is thereby supported on the first rib element 20 via the sliding link 40. As a result, the third rib element 22 is inclined in relation to rib element 21 by rotation around the rotating link 31. In the case of rib element 23 and the following rib elements, this inclination also causes a corresponding inclination because of their attachment via rotating links as well as sliding links. This kinematic principle is thus continued from rib element to rib element as far as desired. In this case, only at least three rib element must be provided to assure the principle. A maximum number of rib elements is, however, not given. The kinematic principle can be realized with any number of rib elements.

The angle of inclination of the individual rib elements to one another can be varied individually. This is achieved by appropriate selection or variation of the length ratios of the regions between the respective rotating links 30, 31; 31, 32; 32, 33; 33, 34; or between the rotating and sliding links 30, 40; 40, 31; 31, 41 etc.

Figure 4:
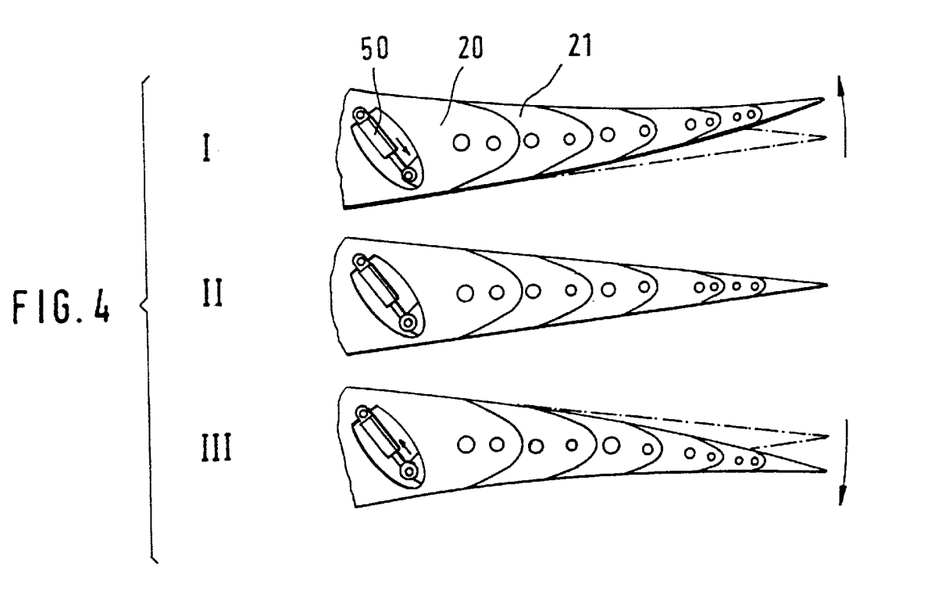
FIG. 4 shows a side view of the flexible region as a detailed view according to FIG. 2 in normal position, in a position deflected out upwards as well as downwards.

FIG. 4 shows three possible positions of a respective flexible region 13 of the ribs. Position I thereby represents upward arching of the flexible region 13, position II represents the normal position and position III represents downward arching of the flexible region. For upward arching the actuator 50 is extended downwards (see arrow in position I), as a result of which the second rib element 21 is inclined in relation to the first rib element 20. To create downward arching, on the other hand, the actuator is run in (upwards) in the direction of the arrow shown in position III. As a result, rib element 21 is in turn inclined in relation to rib element 20, as a result of which a downward movement of the trailing edge of the wing is generated.

Figure 5:
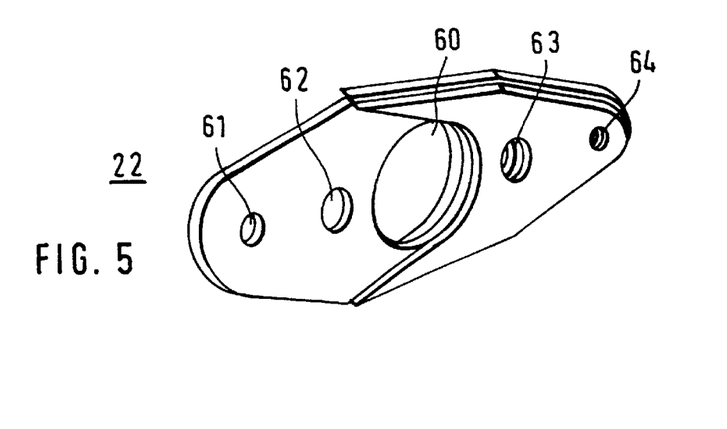
FIG. 5 shows a perspective view of an embodiment of a flat, disc-shaped rib element.

FIG. 5 shows a perspective view of rib element 22. Rib element 22 has a central opening 60. The central opening 60 is flanked on both sides by further openings 61 to 64. The rib element is essentially flat and disc-shaped.

Figure 6:
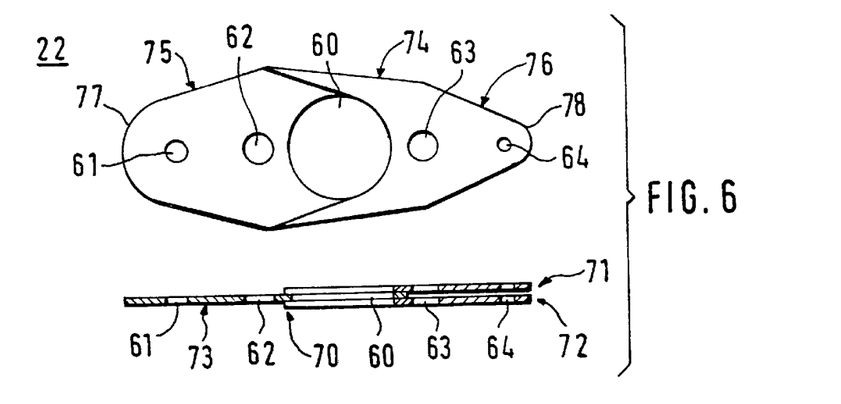
FIG. 6 shows a side view and also a sectional view of the rib element according to FIG. 5.

FIG. 6 shows a side view as well as a sectional view through rib element 22. The arrangement of the openings 60 to 64 is more clearly evident in the side view. The openings have different diameters. Inside the largest opening, namely the central opening 60, a sliding or rotating link is provided. As a result, a corresponding sliding movement, respectively restricted by the width of the opening, can be executed inside this opening. As may be seen from the sectional view according to FIG. 6, the opening is provided in the region of the rib element, in which a forked arrangement 70 is disposed. When the individual rib elements are joined together, the two fork parts 71, 72 resulting from the forked arrangement engage around a section of the following rib element corresponding to the flat fork stem 73 of rib element 22. As a result, the corresponding openings 60, 64 and 61 as well as 63 and 62 are then disposed one behind the other.

To create a structure tapering towards the wing trailing edge, the individual rib elements are also formed to taper accordingly in the centre region 74. The rib element also narrows in the respective end region 75, 76 and has a respective rounded portion 77, 78 at the end. In this case, the opening 61 or 64 respectively forms the centre point of these rounded portions 77, 78.

Figure 7:
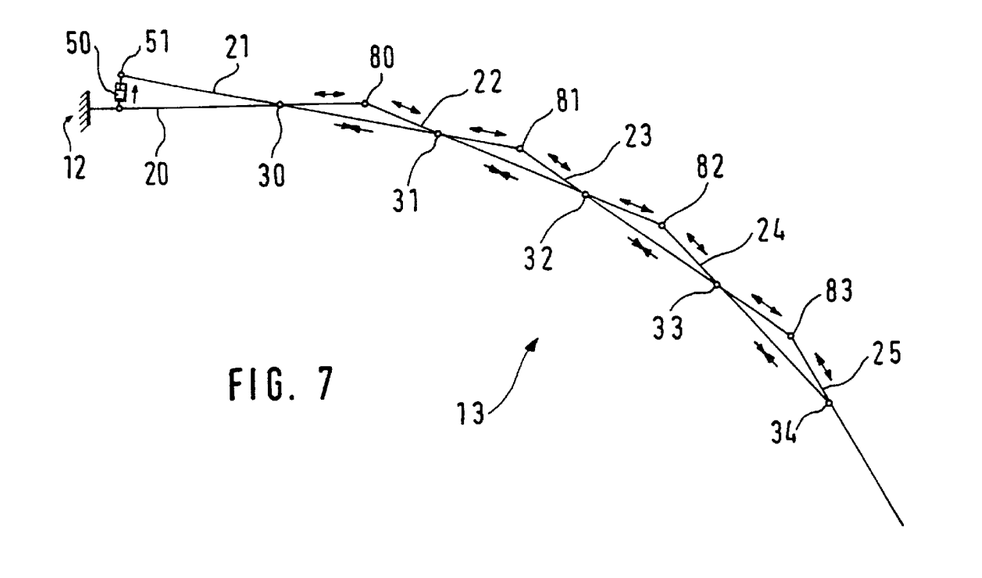
FIG. 7 is an elementary sketch to illustrate the function principle of the arching of the flexible region when only rotating links and elastically expandable and compressible rib elements are provided.

An alternative embodiment of the flexible region 13 is shown in FIG. 7. In contrast to the embodiment shown as an elementary sketch in FIG. 3, in this embodiment the sliding links 40 to 43 are replaced by further rotating links 80 to 83. In order to permit the necessary relative movement of the rotating links amongst themselves, the individual rib elements are elastically expandable and compressible.

On introduction of a force into the actuating link 51 between actuator 50 and rib element 21, this is in turn swivelled around the rotating link 30. As a result, the distance between rotating link 30 and rotating link 80 and also between rotating link 80 and rotating link 31 is increased. These regions of rib elements 20 and 22 are thereby exposed to tensile stress. At the same time, the region between rotating links 30 and 31 is compressed, as a result of which the element 21 is thereby subjected to pressure stress in this region. These compressions and expansions can be absorbed by suitable material selection for the rib elements of the rib structure. Advantageously, the sliding links can be omitted as a result of this and replaced by correspondingly formed rotating links.

Figure 8:
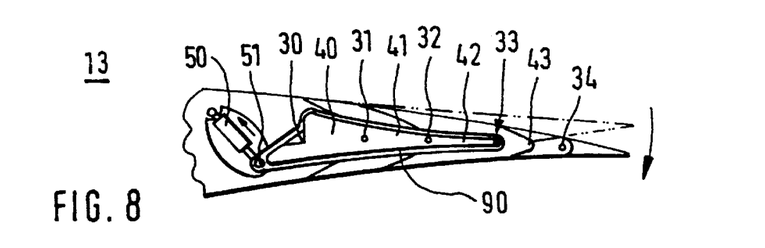
FIG. 8 shows a side detail view of a second embodiment of the flexible region with a lever element.

FIG. 8 shows a side view of a further embodiment of a flexible region 13 constructed according to the invention. In this embodiment a lever element 90 is provided in addition to the components evident from FIG. 2. The lever element 90 is articulated in a force-absorbing manner to the actuator 50, namely in the actuating link 51, and to rib element 20 via rotating link 30, and also to rib element 23 via rotating link 33.

Figure 9:
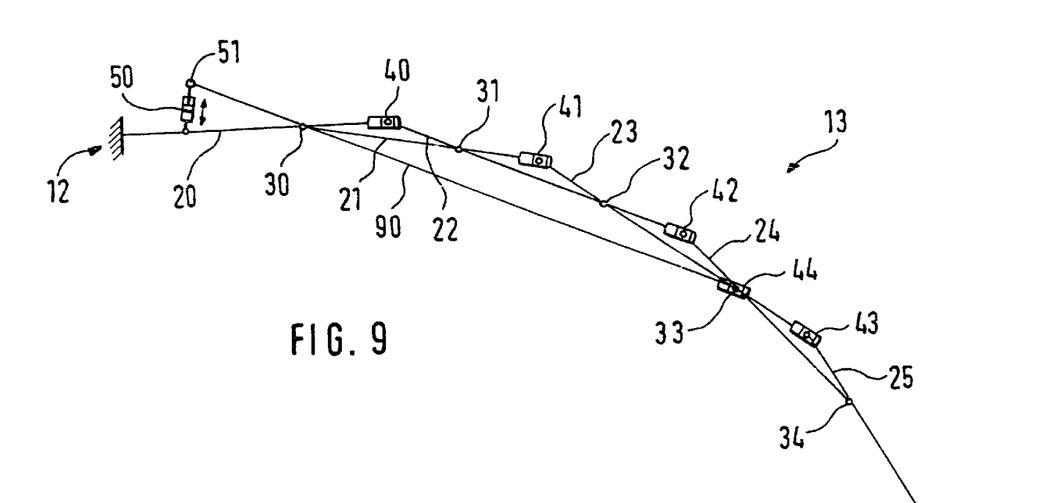
FIG. 9 is an elementary sketch to illustrate the function principle of the flexible region according to FIG. 8.

The function principle of this embodiment is more clearly evident from the elementary sketch according to FIG. 9. By providing the lever element 90, the stresses in the rotating links as well as the structural stresses are reduced, and at the same time the driving power, which must be exerted by the actuator 50, is reduced. The actuator 50 directs a force via the actuating link 51 into the lever element 90. The lever 90 is disposed in rotating link 30 and connected to rotating link 33 via a sliding link 44. If the lever element 90 is moved via the actuator 50, i.e. swivelled around the rotating link 30, rib elements 24 and 23, and as a result rib elements 25, 22 and 21, are also moved. Operation is performed here in accordance with that outlined in association with FIG. 3.

For optimisation of the process, the corresponding contact point for the lever element 90 can likewise be varied. However, at least four rib elements must be provided to be able to use the lever element at all. However, there is no restriction in the direction of the maximum number of rib elements.

Figure 10:
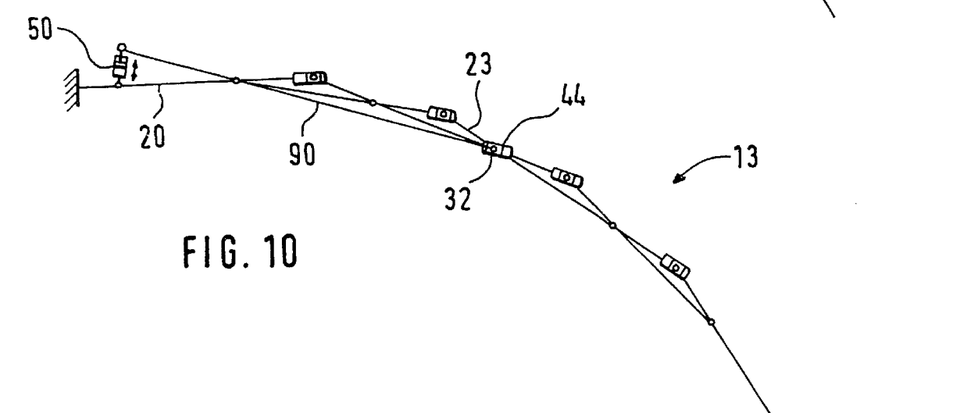
FIG. 10 is an elementary sketch to illustrate the function principle of a flexible region with a lever element.

FIG. 10 shows a further embodiment of the flexible region according to the invention in the form of an elementary sketch. In contrast to the embodiment according to FIG. 9, the lever element 90 is thereby connected to the rotating link 32 via the sliding link 44. The lever element 90 is therefore attached thereby to the flexible region in the region of rib element 23.

Figure 11:
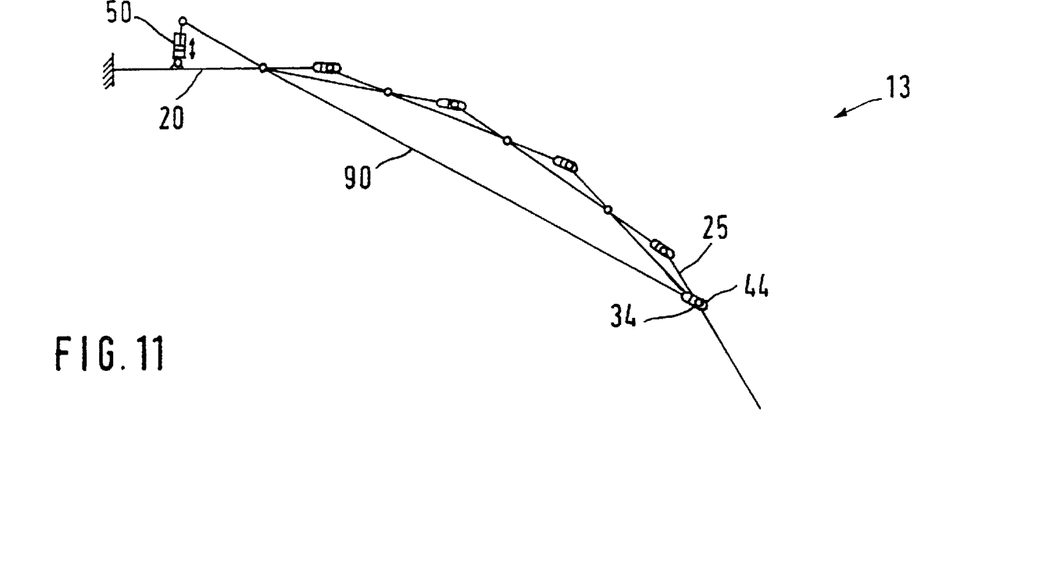
FIG. 11 is an elementary sketch to illustrate the function principle of a further alternative embodiment of a flexible region with a lever element.

FIG. 11 shows a further alternative embodiment. In contrast to FIGS. 9 and 10, lever element 90 is thereby connected to rotating link 34 via sliding link 44. Therefore, an attachment to the flexible region via rib element 25 occurs thereby.

Figure 12:
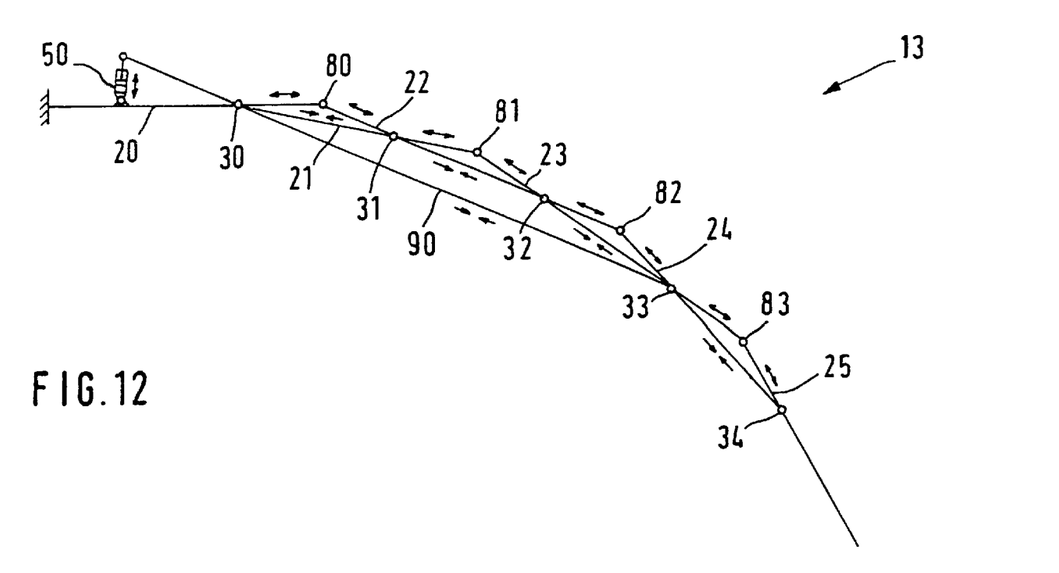
FIG. 12 is an elementary sketch to illustrate the function principle of a flexible region with a lever element corresponding to FIGS. 8 and 9, wherein only rotating links are provided.

FIG. 12 shows a further embodiment of a flexible region 13 constructed according to the invention. Lever element 90 is provided in this case, as already shown in the previous figures. However, instead of the sliding links in accordance with FIGS. 8 to 11, further rotating links and elastically expandable and compressible rib elements are provided in FIG. 12. This embodiment is therefore similar to the embodiment according to FIG. 7 with respect to the rib elements.

If the actuator 50 is operated, deflection of the lever element 90 out around rotating link 30 occurs. As a result, a force is introduced into rotating link 33. As a result of this, the distance between the two rotating links 30 and 33 is reduced and lever element 90 undergoes compression.

As already indicated by the arrows and described in association with FIG. 7, the remaining rib elements are likewise expanded or compressed and are therefore subjected to tensile and pressure stresses respectively. However, these are absorbed by the elastically formed structure of the rib elements.

The position of the contact point of the lever element 90 can likewise be changed, as already shown in FIGS. 10 and 11. In these figures, only the sliding links are dispensed with then and are replaced by corresponding rotating links 80 et seq.

Figure 13:
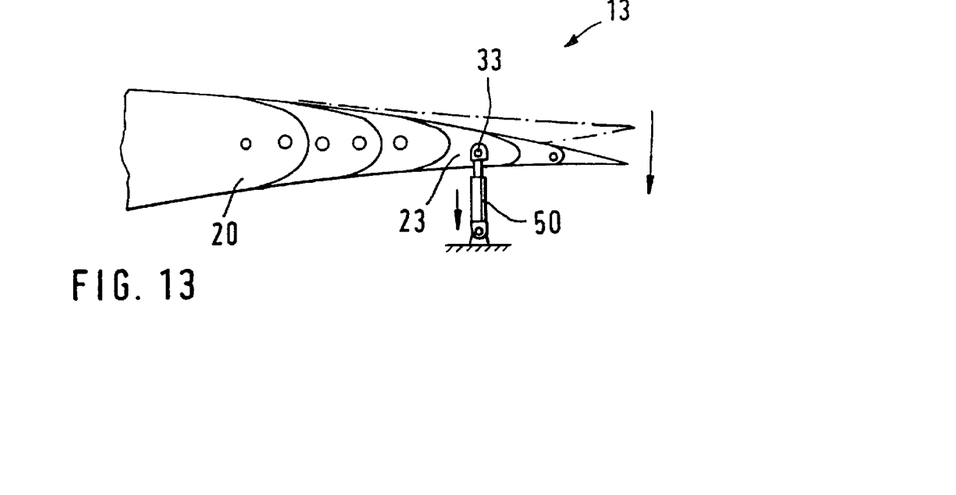
FIG. 13 shows a side detail view of a further embodiment of the flexible region of the rib structure with an actuator acting on a rotating link.

FIG. 13 shows a further embodiment of a flexible region 13 constructed according to the invention, in which the actuator acts on the hinge bolts 33.

Figure 14:
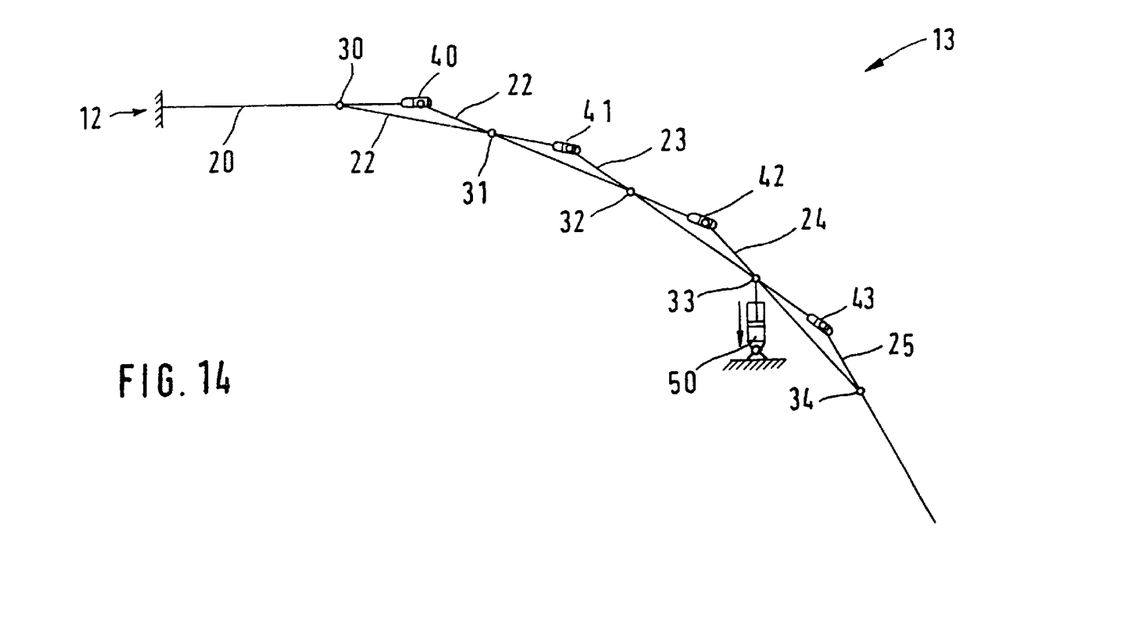
FIG. 14 is an elementary sketch to illustrate the flexible region according to FIG. 13.

FIG. 14 thereby illustrates the function principle on the basis of an elementary sketch of the embodiment according to FIG. 13. A force is introduced into rotating link 33, namely into a bolt provided there as rotating link, by the actuator 50, which is attached rigidly inside the wing structure. This causes outward deflection of the rib element 23. Rib element 24 is also moved. Because of the kinematic connection in the chain, the remaining rib elements are also moved one after the other as a result.

This arrangement as embodiment provides the possibility of allowing the actuator to act on each bolt inside the kinematic chain. As a result, the force can be introduced into the flexible region of the rib structure at any point.

Figure 15:
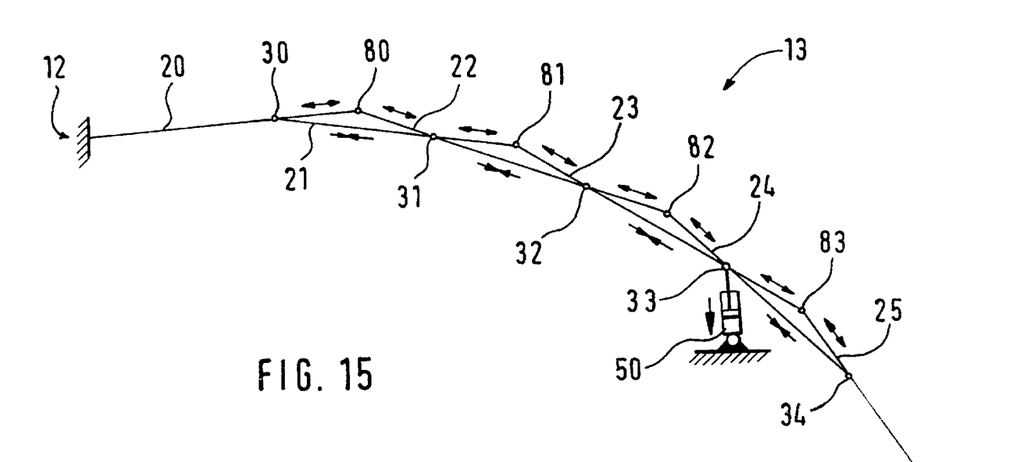
FIG. 15 is an elementary sketch to illustrate an alternative embodiment of the flexible region with exclusive provision of rotating links and an actuator acting on a rotating link.

Instead of the sliding links 40 to 43 shown in FIG. 14, correspondingly formed rotating links 80 to 83 may also be provided, as is evident from FIG. 15. The respective rib elements are thereby also in elastically expandable and compressible form. The expansions and compressions resulting on outward deflection of the actuator are shown in FIG. 15 by appropriate arrows and are also evident in appropriately modified form from the description relating to FIG. 7.

Figure 16:
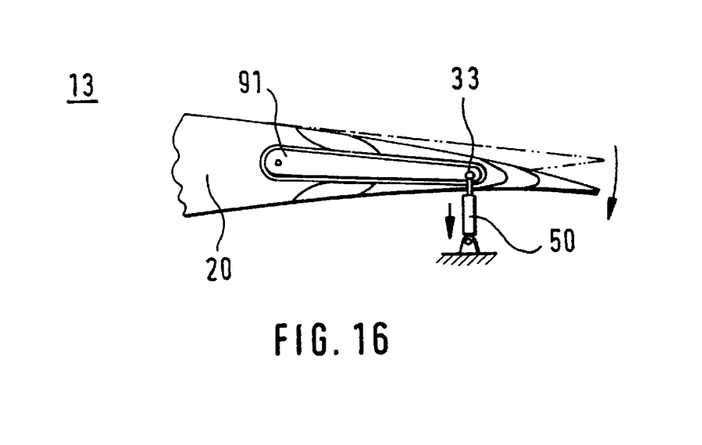
FIG. 16 shows a side view of a outwardly deflected flexible region in an alternative embodiment with a further lever element and an actuator acting thereon.

FIG. 16 shows a further embodiment of an elastic region 13 constructed according to the invention. A lever element 91 is provided in this embodiment. A force is introduced into this lever element 91 by the actuator 50 fixed in the wing. This preferably occurs via a hinge bolt, here that of link 33. This embodiment can be varied as desired depending on the length of the selected lever element 91 and the arrangement position of the actuator 50. Any bolt of a rotating link between the individual rib elements can be actuated by the actuator 50. The rest of the structure of this embodiment can also be as desired, in particular can correspond to the structure of one of the figures described above.

Figure 17:
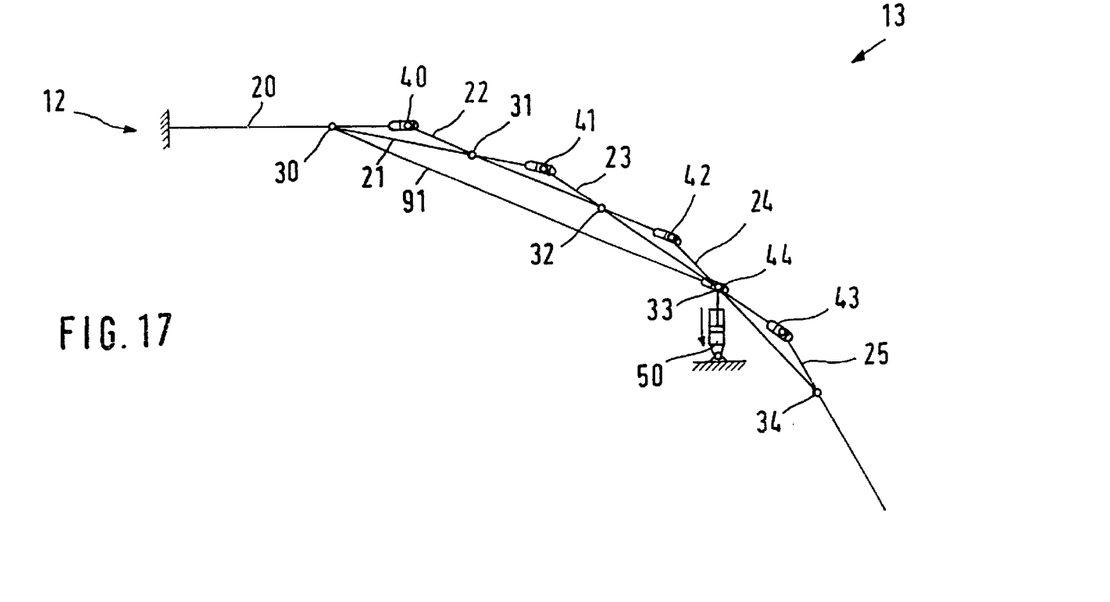
FIG. 17 is an elementary sketch to illustrate the flexible region according to FIG. 16.

FIG. 17 shows the function principle of the arrangement according to FIG. 16. Lever element 91 is also moved by outward deflection of the actuator 50. The rib elements associated with this are thus likewise moved one after the other according to the kinematic principle. Movement of one element thereby also causes the movement of the following element. As a result, a continuous arching of the wing is generated.

Figure 18:
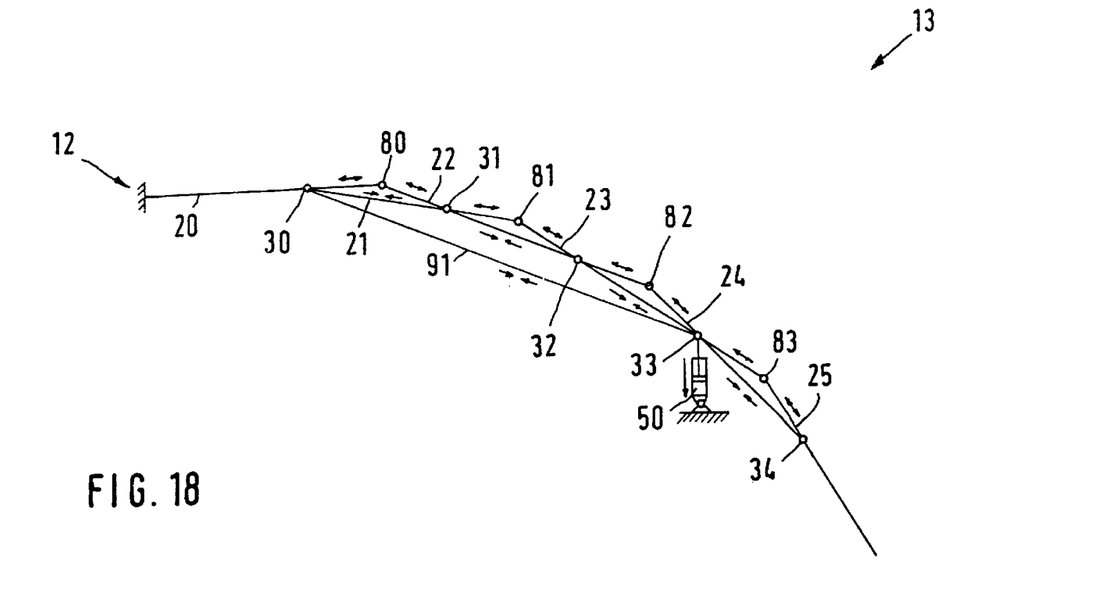
FIG. 18 is an elementary sketch to illustrate an alternative embodiment of a flexible region exclusively with rotating links, actuator and a further lever element corresponding to FIG. 16.

FIG. 18 shows a further embodiment of a flexible region 13 constructed according to the invention in the form of an elementary sketch. In contrast to the two illustrations according to FIG. 16 and FIG. 17, sliding links 40 to 43 are in turn replaced by rotating links 80 to 83 in this embodiment. Corresponding tensile and pressure stresses are in turn absorbed by the expandable and compressible elasticity of the rib elements, as already shown and explained in FIGS. 15, 12, 7. In this case, a force is firstly introduced into lever element 91 by the actuator 50. As a result, the lever element swivels in the region of link 30. As a result, the region between rotating link 30 and rotating link 33 is in turn compressed. On the basis of the kinematic principle, compressions and expansions are also generated in the remaining rib elements. This is respectively indicated in FIG. 18 by the double arrows. The actuator 50 is fixed at any point in the wing. Alternatively or additionally thereto, actuators can also be provided in the region of several or all the links.

Reference is made to the remaining figures with lever element and without lever element for the number of rib elements to be provided for the corresponding embodiments according to FIG. 18 or the above figures. Where one lever element is provided, at least four rib elements must be provided, only three rib elements being necessary in embodiments without a lever element. The maximum number of rib elements is not restricted, as has already been described above. Similarly, the number of actuators is not restricted. In place of the linear actuators 50 shown in the previous figures, rotary actuators may also be used. As a result, a moment would then be introduced into the respective bolts of the rotating links. However, there- is no change in the function principle of the kinematic chain as a result, which is why a detailed description, particularly in the form of further figures, is considered unnecessary at this point.

Instead of the force being introduced by the actuator into a bolt of a link, there is also the possibility of introducing this force directly into any rib element. The position of force introduction can be freely selected thereby. As a result of this, there is theoretically an infinite number of arrangement possibilities for the force introduction by an actuator. Therefore, corresponding graphic representations have been dispensed with at this point. The function principle thereby corresponds essentially to that outlined in the previous figures.

A further possibility is to provide a respective actuator at the two outer side ends of the wing structure and to connect the flexible regions of the individual ribs to one another by a rod-shaped means. The connection into a respective rotating link is preferably achieved so that all the first or nth rib elements of the ribs are actuated simultaneously in parallel.

Figure 19:
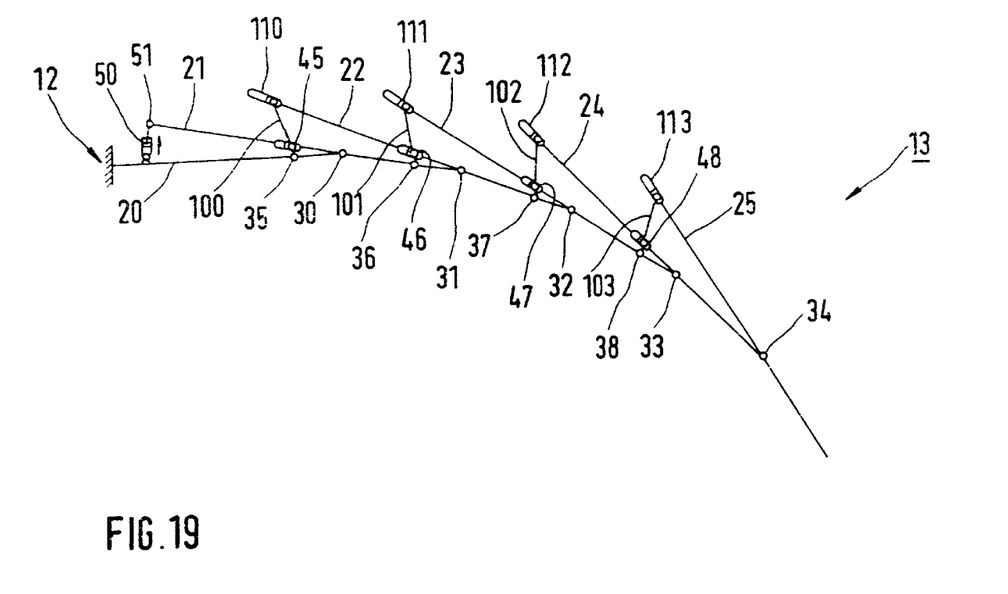
FIG. 19 is an elementary sketch to illustrate an alternative embodiment of the flexible region with further lever elements.

A further alternative embodiment of the flexible region 13 constructed according to the invention is evident from FIG. 19, which shows an elementary sketch. Further lever elements 100 to 103 are provided in this embodiment. The actuator 50 is supported on the first rib element 20. The first rib element 20 is also firmly connected to the rigid region 12 of rib 11.

The second rib element 21 is driven by the actuator 50 via the actuating link 51. The second rib element 21 is connected to the first rib element 20 via rotating link 30. The third rib element 22 is coupled to the second rib element 21 by means of rotating link 31.

The connecting member between the first three rib elements is the lever element 100. This is rotatably connected to the first rib element 20 in link 35, to the second rib element 21 via a sliding link 45 and to the third rib element 22 via a further sliding link 110.

Connection of the respectively following rib elements to the second and third rib elements is provided accordingly. The third rib element 22 is thereby connected to the second rib element 21 via rotating link 31, the fourth rib element 23 is connected to the third rib element 22 via rotating link 32, the fifth rib element 24 is connected to the fourth rib element 23 via rotating link 33 and the sixth rib element 25 is connected to the fifth rib element 24 via rotating link 34. Attachment of the respective lever elements 101, 102 and 103 to the respective rib elements is achieved via rotating links 36, 37, 38 as well as sliding links 46, 47, 48 and 111, 112 and 113.

If the actuator 50 is operated, the second rib element 21 is inclined by rotation around the rotating link 30. As a result, the lever element 100 is inclined via sliding link 45 by rotation around rotating link 35. Because of the inclination of lever element 100, the third rib element 22 is rotated around rotating link 31 via sliding link 110. An inclination of the third rib element 22 in relation to the second rib element 21 is achieved as a result of this.

Because of the construction of a kinematic chain, the following rib elements are deflected outwards accordingly, as a result of which the desired arching of the wing trailing edge is generated. The embodiment shown in FIG. 19 can be used for a flexible region having at least three rib elements. The maximum number of rib elements is not restricted, and therefore as many rib elements as desired can be connected one behind the other.

The inclinations of the individual rib elements towards one another can be varied individually by varying the respective length ratios of lever elements 100, 101, 102 and 103 as well as rib elements 20 to 25.

The principle of the additional provision of lever elements shown in FIG. 19 can also be combined with the embodiments shown in the previous figures. In particular, instead of the sliding links in the embodiment according to FIG. 19, the elasticity of the structure may also be utilized there and the sliding links replaced by rotating links. Such a modification was described, for example, in FIG. 7. The positioning of the actuator 50 may also be varied, as already described in association with FIGS. 13 to 18. According to this, the actuator can act both on a hinge bolt and on the rib elements themselves.

It will be understood that various modifications may be made to the embodiments disclosed herein. Therefore, the above description should not be construed as limiting, but merely as exemplifications of a preferred embodiment. Those skilled in the art will envision other modifications within the scope and spirit of the invention.

What is claimed is:

1. An aerofoil profile with variable profile adaptation, comprising:

a rib having a substantially rigid region and a flexible region, the flexible region of the rib including at least a first rib element, a second rib element and a third rib element, the rib elements being articulated to one another in a kinematic chain arrangement wherein at least two connecting members link both the second rib element and the third rib element to the first rib element; and driving means for the introduction of force into the flexible region of the rib wherein movement of at least one of the first, second or third rib elements results in movement of the rib elements to which it is articulated.

2. The aerofoil profile according to claim 1, wherein the rib elements are at least partially elastically expandable and compressible.

3. The aerofoil profile according to claim 2, wherein rotating links are provided between the rib elements.

4. The aerofoil profile according to claim 3, wherein rotating links and sliding links are provided.

5. The aerofoil profile according to claim 1, wherein the rib elements have openings, each opening being configured and dimensioned to receive a link selected from the group consisting of a sliding link and a rotating link, and wherein the rib elements and are constructed and arranged to be connected to the adjacent rib elements.

6. The aerofoil profile according to claim 5, wherein a large central opening is provided and adjacent to it two respective further openings are provided.

7. The aerofoil profile according to claim 1, wherein the first rib element is connected rigidly to the rigid region of the rib, is connected via a rotating link to the second rib element and is connected via one of a sliding link or a rotating link to the third rib element, and wherein the second rib element is connected to the third rib element via a rotating link.

8. The aerofoil profile according to claim 1, wherein at least four rib elements are provided and further including a lever element into which the driving means introduces a force, the lever element being disposed in two of the links of the flexible region of the rib structure.

9. The aerofoil profile according to claim 1, wherein the driving means is an actuator, which is supported in the first rib element and introduces a force into the second rib element.

10. The aerofoil profile according to claim 1, wherein the driving means is an actuator, which is supported in the aerofoil profile and introduces a force into any member connecting the rib elements to one another.

11. The aerofoil profile according to claim 1, wherein the driving means is an actuator, which is supported in the aerofoil profile and introduces a force into at least one of the at least first, second and third rib elements.

12. The aerofoil profile according to claim 1, wherein the driving means is a linear actuator.

13. The aerofoil profile according to claim 1, wherein one or more lever elements are provided, which respectively articulate the first, second and third elements to one another and wherein the one or more lever elements are connected to the rib elements via one of a rotating or sliding link.

14. The aerofoil profile according to claim 1, wherein the rib elements are flat and disc-shaped.

15. The aerofoil profile according to claim 14, wherein a surface normal to the flat and disc-shaped rib elements runs approximately perpendicular to the rib.

16. The aerofoil profile according to claim 14, wherein the ribs have a symmetrical structure.

17. The aerofoil profile according to claim 1, wherein the driving means is a rotary actuator.

18. The aerofoil profile according to claim 1, wherein the rib elements are essentially rigid.

19. The aerofoil profile according to claim 14, wherein a surface normal to the flat and disc-shaped rib elements runs approximately parallel to an edge of the aerofoil profile.

20. The aerofoil profile according to claim 13, wherein the one or more lever elements are connected to each of the at least first, second and third rib elements via a link, and wherein the link is selected from the group consisting of a rotating link and a sliding link.

21. The aerofoil profile according to claim 1, wherein the driving means is an actuator which introduces a force into at least one of the at least first, second and third rib elements.

* * * * *